Aug. 11, 1970          J. N. KELLEY          3,524,035
METHOD AND APPARATUS FOR FORMING SPIRAL PIPE
Filed Oct. 4, 1967                    2 Sheets-Sheet 1
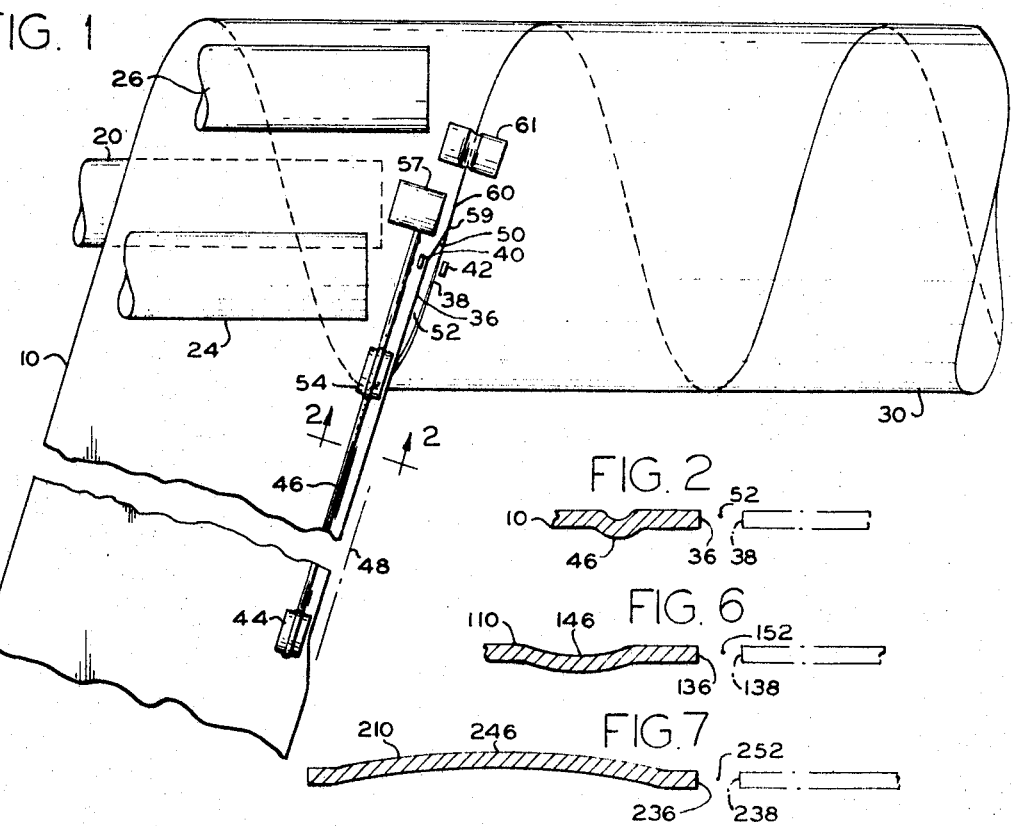
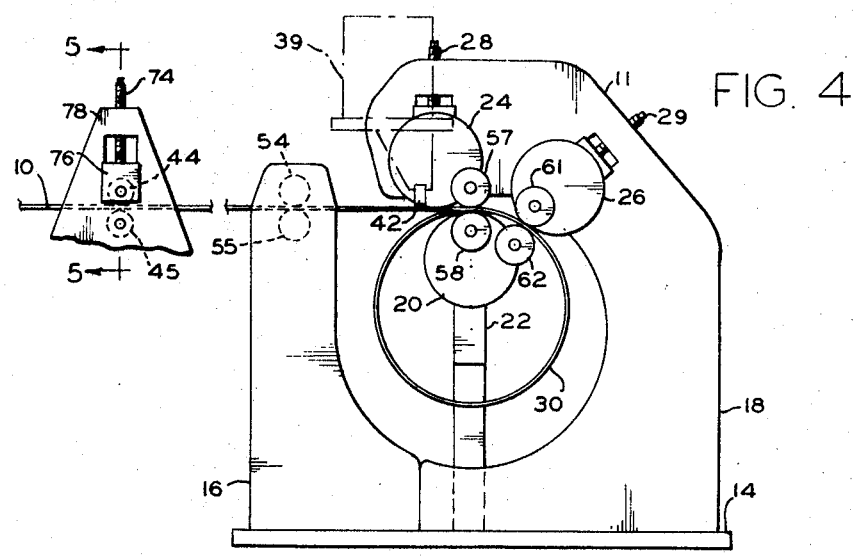
JOHN N. KELLEY
INVENTOR
BY
BUCKHORN, BLORE, KLARQUIST & SPARKMAN
ATTORNEYS Aug. 11, 1970   J. N. KELLEY   3,524,035
METHOD AND APPARATUS FOR FORMING SPIRAL PIPE
Filed Oct. 4, 1967   2 Sheets-Sheet 2
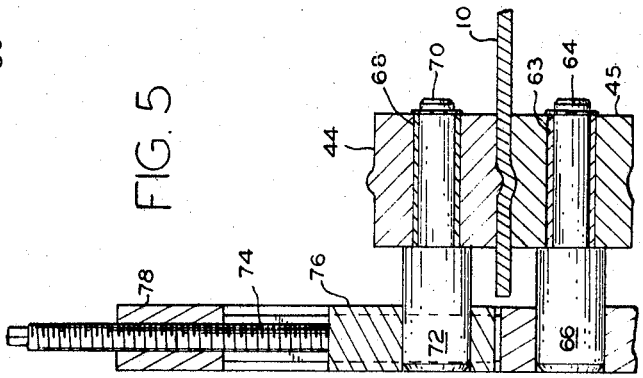
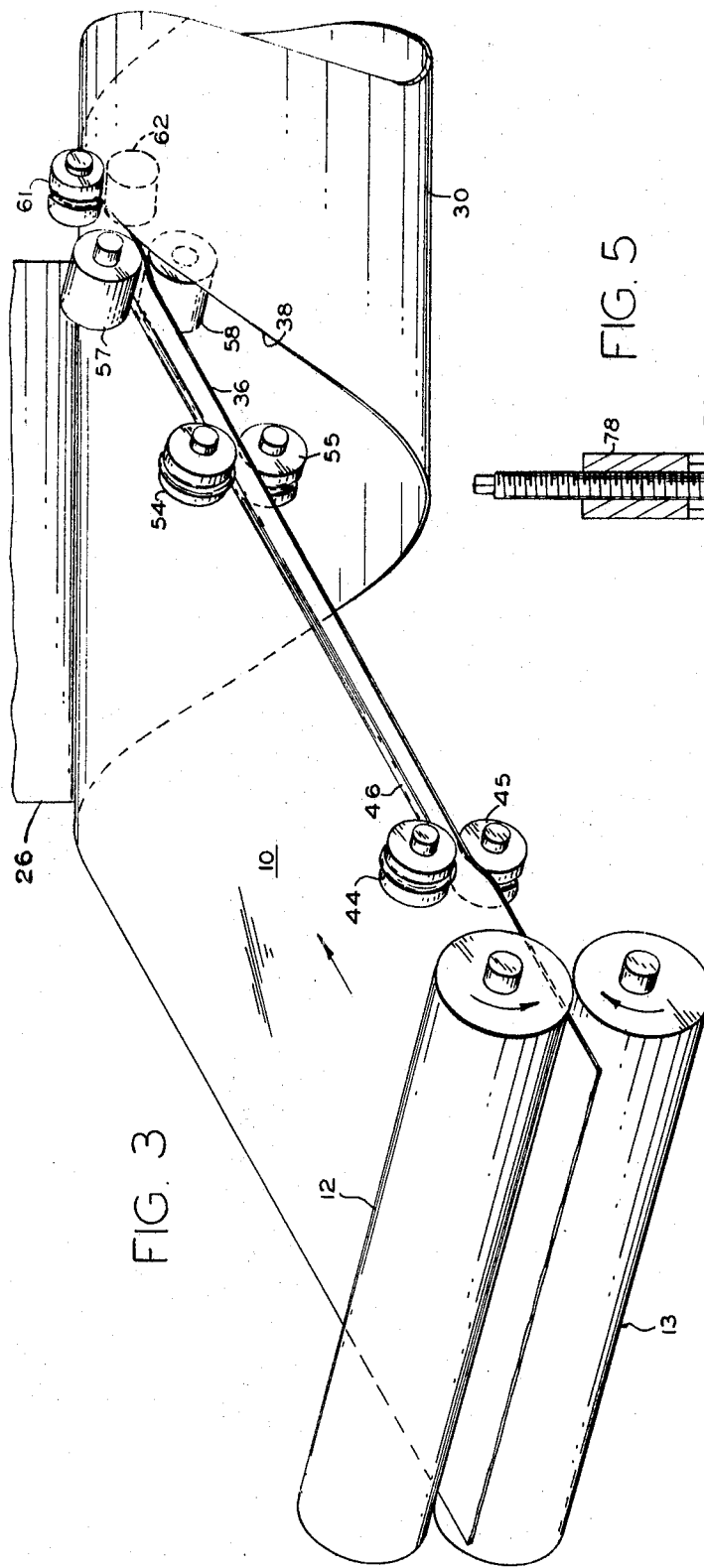
JOHN N. KELLEY
INVENTOR
BY
BUCKHORN, BLORE, KLARQUIST & SPARKMAN
ATTORNEYS

3,524,035
METHOD AND APPARATUS FOR FORMING SPIRAL PIPE
John N. Kelley, Portland, Oreg., assignor to Beall Pipe and Tank Corporation, Portland, Oreg., a corporation of Oregon
Filed Oct. 4, 1967, Ser. No. 672,805
Int. Cl. B23k *11/08*
U.S. Cl. 219—62                                          3 Claims

ABSTRACT OF THE DISCLOSURE

A method and apparatus for continuously producing spiral pipe from sheet material by high frequency electrical welding wherein a buckle is formed adjacent the forward edge of the infeeding sheet material prior to the same being formed into a spiral loop, the forward edge thereby being held in a spaced apart relationship with respect to the trailing edge of the loop. Pressure applied normally to the forward edge subsequent to its electrical heating moves the edge, laterally only, into parallel abutment with the trailing edge of the loop so that the welding process can occur with no nonplanar relative movement between the two edges.

BACKGROUND OF THE INVENTION

This invention relates to a method and apparatus for the continuous production of spiral pipe from sheet material and, more particularly, to the continuous production of such pipe by high frequency electrical welding.

In prior methods for the production of spiral pipe from sheet material by high frequency electrical welding, the forward edge of the incoming sheet material tends to contact the trailing edge of the already formed spiral loop in advance of the actual point where the spiral formation is complete. Since the two edges are heated to a molten state prior to such contact and include an excess material over the theoretical width to allow for the material squeezed out and lost in the welding process, they are subjected to a shearing action as they move relative to one another while coming together. This vertical or out-of-plane motion occurs throughout the distance from the initial contact to the point where the two edges complete the formation of the spiral tube. This shearing action of the molten edges in the weld area has resulted in the formation of an unsatisfactory joint.

Furthermore, to form a satisfactory weld by high frequency electrical welding, the face of the forward edge of the incoming sheet and the face of the trailing edge of the spiral loop must be perfectly parallel to one another, as well as exactly equal in thickness, when they come together. It has been found that if the edges are not exactly equal in thickness, one of the two edges will overheat, resulting in a poor weld. If the faces are out of parallel, there will be premature contacting and inconsistent weld quality through the entire thickness of the joint.

Spiral pipe production by prior methods of high frequency electrical welding has further required that the convergence angle between the forward edge of the incoming sheet and the trailing edge of the spiral loop be maintained absolutely constant, so that the electrical circuit formed along the edges from the electrical contacts to the initial contact point of the two edges also remains constant. Even slight variations in the convergence angle resulted in variations in the above-mentioned electrical circuit, which in turn resulted in poor welding conditions.

SUMMARY OF THE INVENTION

In accordance with the present invention a buckle is formed adjacent the forward edge of the incoming sheet material prior to such material being formed into a spiral loop. The forward edge of the infeeding sheet material is thus held in a spaced apart relationship with respect to the trailing edge of the loop by virtue of the lateral or planar movement of the forward edge caused by the buckle. The thickness of the forward edge, however, is not altered inasmuch as the edge itself is not deformed.

A high frequency electrical current is used to heat the forward edge of the infeeding sheet material and the trailing edge of the spiral loop in the region of the juncture in accordance with standard high frequency electrical resistance welding techniques. The controlled lateral displacement of the forward edge of the infeeding sheet material makes it possible to maintain a constant convergence angle between the forward edge of the infeeding sheet material and the trailing edge of the loop. Such lateral displacement of the forward edge also makes it possible to maintain a larger convergence angle than would otherwise be possible, thereby to avoid free-arcing of current across the gap. The result is that the aforementioned electrical circuit can be more carefully controlled than was heretofore possible.

Subsequent to the heating of the forward and trailing edges of the material, the heated forward edge of the incoming sheet material is squeezed to flatten out the buckle and move the edge laterally only into parallel abutment with the heated trailing edge of the loop with no nonplanar or shearing movement therebetween. The two edges fuse upon contact and are welded together by the lateral pressure generated by the squeezing out of the buckle.

The present invention makes it possible precisely to control the relationship of the two edges during the entire welding process. The buckled strip is in effect a calculated overwidth of strip which provides an excess of material immediately forward of the weld point. When this excessive material is squeezed out, the welding process can then occur. In the present invention, it consists of an initial instantaneous fusion when the two molten edges come together, and a final forging provided by the lateral pressure generated by the squeezing. The only motion between the two edges is a planar motion resulting in an abutment of the edges with their two faces exactly parallel. The only movement of the faces of the two edges from their first contact immediately ahead of the weld point through the welding process is a movement of the forward edge directly toward the trailing edge. Thus, the entire fusion between the two edges is accomplished in a manner which avoids any shearing action in the weld area.

The fact that the buckle is formed on one edge only of the incoming sheet requires that a flattening roll be provided only on that one side, and this avoids any possibility of short circuiting in the high frequency electrical path. Since the convergence angle between the two edges can be maintained constant, any slight variations that occur in the width of the sheet material can be accurately compensated for. Finally, since the thickness of the edge is not changed, uneven heating in the weld due to variations in thickness cannot occur.

BRIEF DESCRIPTION OF THE DRAWINGS

In the drawings:

FIG. 1 is a plan view, with parts broken away, showing the formation of spiral pipe in accordance with the practice of the present invention;

FIG. 2 is a sectional view taken along line 2—2 of FIG. 1;

FIG. 3 is a perspective view of apparatus constructed in accordance with the present invention.

FIG. 4 is a side elevational view of apparatus constructed in accordance with the present invention;

FIG. 5 is a cross-sectional view taken on line 5—5 of FIG. 4;

FIG. 6 is a sectional view similar to that of FIG. 2 showing an alternate embodiment of the present invention; and FIG. 7 is a sectional view also similar to that of FIG. 2 showing still another embodiment of the present invention.

DESCRIPTION OF THE PREFERRED EMBODIMENT

Referring to the drawings and in particular to FIGS. 1, 3 and 4, sheet material 10 is continuously fed into a tube forming apparatus 11 by counter-rotating feed rolls 12, 13 (FIG. 3). The tube forming apparatus 11 is mounted on a base plate 14 which in turn supports a front vertical stanchion 16, a back vertical stanchion 18, and an interior forming roll 20 mounted on a cantilevered support 22. Outer forming rolls 24, 26 are supported by stanchion 18 through adjustable assemblies 28, 29, respectively, and together with the interior roll 20 constitute the means by which the infeeding sheet material 10 is formed into a spiral loop 30.

The forward edge 36 of the infeeding sheet material 10 and the trailing edge 38 of the spiral loop 30 are heated by a high frequency electrical unit 39 having contact shoes 40 and 42 mounted for engagement with the edges 36 and 38, respectively. Engagement of the contacts with the edges of the material causes a high frequency current to flow through the edges and across the juncture point to heat the edges to a welding temperature. Commercially available high frequency equipment may be used in the practice of this invention, the heating being caused by frequencies in the neighborhood of 450,000 cycles per second.

A feature of the invention resides in the preparation of the material adjacent the forward edge 36 of the incoming sheet material 10 prior to its entry into the tube forming apparatus 11. The forward edge 36 after passing through feed rolls 12, 13 passes between two buckling rolls 44, 45 which are shaped to form a permanent corrugation or plastic buckle 46 adjacent the edge.

The thus corrugated sheet of material 10 then passes between upper and lower guide rolls 54, 55 mounted on stanchion 16, the surfaces of which rolls are formed to ride on and in the buckle 46. The rolls 54, 55 contact the sheet material by means of the buckle 46 only; that is, the rolls 54, 55 use the buckle 46 as a track, thus avoiding any side pressure on the edge 36. Since the buckling rolls 44, 45 are also seen to exert pressure on the sheet 10 only in a direction perpendicular to the plane of the sheet, there is thus no side pressure exerted on the forward edge 36 either by the buckling rolls 44, 45 or the guide rolls 54, 55, and all possibility of damage to the face of the edge 36 is accordingly eliminated.

Formation of the plastic buckle 46 moves the edge 36 laterally only—that is, in the plane of the sheet 10—towards the center of the sheet. This moves the edge 36 laterally away from the trailing edge 38 of the spiral loop 30 to hold the sheet 10 in a spaced apart relationship with respect to the loop 30.

As indicated in FIGS. 1 and 2, formation of the plastic buckle 46 moves the edge 36 away from the path 48 which it would normally follow to provide a gap 52. Movement of the edge thus increases the convergence angle 50, which reduces the tendency of the high frequency current to "free-arc" across the gap, and also eliminates any shearing action between the edges 36 and 38.

Subsequent to the introduction of the high frequency electrical current into the edge 36 by the contact shoe 40, the sheet 10 passes between flattening or squeezing rolls 57, 58 which squeeze the buckle 46 back into its original flat configuration and move the edge 36, laterally only, into parallel abutment with the heated trailing edge 38 of the spiral loop 30.

Movement of the edge 36 brings it back to the juncture point by a motion which occurs only in the plane of sheet 10. The two edges 36 and 38, which have been heated by the high frequency current, fuse upon contact at point 59, and the welding process is completed at point 60 by the lateral pressure generated by the squeezing out of the buckle. Positioning rolls 61, 62, are used to maintain the joint in proper position after the weld is complete. The entire welding process is thus seen to occur with no nonplanar relative movement between the edges 36 and 38.

Shearing action between the heated edges in the weld area is thus completely eliminated. The thickness of the forward edge 36 is not altered at all during the process, and of course, the thickness of the trailing edge 38 is in no way affected either.

FIG. 5 shows a cross-sectional view through the corrugating rolls 44, 45. Lower roll 45 is fixed, rotating on a bearing 63 on an axle 64 in a fixed support 66. Upper corrugating roll 44 is adjustable and also rotates on a bearing 68 on an axle 70 in a support 72, which latter support is movable by pressure exerted by an adjusting screw 74 on an adjustable block 76 retained in a bracket 78. Adjustability of the upper corrugating roll 44 thus makes it possible to accommodate differing sheet thicknesses.

The size and character of the buckle 46 is determined by the amount that the edge 36 must be moved laterally in the plane of the sheet 10 from the path 48 that it would normally follow (FIG. 1). The amount of lateral movement is, in turn, determined by the size of the angle 50 that is required for proper welding conditions.

FIG. 2 illustrates a buckle 46 in sheet 10 which, because of the movement of edge 36 that is required, causes a plastic deformation in the sheet. It is possible, however, that a buckle of lesser magnitude may be required and that such a buckle would result only in an elastic deformation of the sheet. Such a condition is shown in FIG. 6, wherein a sheet of material 110 is corrugated by the formation of an elastic buckle 146, thereby to move forward edge 136 away from trailing edge 138 to form a gap 152. In this embodiment, the buckling rolls are placed closer to the squeezing rolls to maintain the elastic buckle until it is released under the squeezing rolls.

The conditions may also be such that an elastic buckle encompassing the width of the entire sheet may be possible. Such a condition is shown in FIG. 7, wherein elastic buckle 246 is formed in sheet 210, thereby to move forward edge 236 away from trailing edge 238 to form gap 252. None of the modifications shown, however, deform either edge of the sheet of material or alter its thickness.

The invention can also be used to form corrugated pipe by using one of the normal corrugations in the infeeding sheet as a buckle which can be overformed to move the adjacent edge laterally as required. In this case the squeeze rolls press the overformed corrugation back only to its normal configuration to move the forward edge into abutment with the trailing edge of the spiral loop.

EXAMPLE

Two 40 foot lengths of 18 inch diameter spiral pipe were made according to this invention from a 44 inch wide sheet of 10 gauge steel. A plastic buckle one inch wide by 3/8 inch high was formed with its center one inch from the edge of the infeeding sheet. The buckle moved the forward edge of the sheet 3/16 inch inwardly from the path it would have normally followed, and the buckle was subsequently squeezed out to move the edge into parallel planar abutment with the trailing edge of the loop. A highly satisfactory weld was obtained on a continuous basis. Test specimens passed physical requirements for welded steel pipe. The pipe itself passed hydrostatic test requirements.

In the foregoing description, the invention has been described with respect to a certain particular preferred embodiment, although it is to be understood that the specific details shown are merely illustrative and that the invention may be carried out in other ways without departing from the true spirit and scope of the following appended claims.

What is claimed is:
1. A method of continuously producing spiral pipe from sheet material by high frequency electrical welding comprising:
   continuously feeding said sheet material and forming a buckle adjacent one edge only thereof, said buckle being spaced back from said one edge;
   forming said sheet material into a spiral loop, said one edge of said sheet material being held in a spaced apart relationship and forming a convergence angle with respect to the trailing edge of said loop due to the lateral movement of said one edge caused by said buckle, said convergence angle being larger than would occur in the absence of said buckle;
   passing a high frequency electrical current along said one edge of said sheet material and said trailing edge of said loop in the region of the juncture therebetween to form a welding heat therein, said buckle being of such size as to increase said convergence angle sufficiently to avoid free-arcing of current during said passing of current along said edges; and
   squeezing said heated one edge of said sheet material to flatten out said buckle and move said heated one edge laterally only into parallel abutment with said heated trailing edge of said loop, said one edge and said trailing edge fusing together upon contact and being welded by the lateral pressure generated by said squeezing, with no non-planar relative movement therebetween.

2. The method of claim 1 in which said buckle is a plastic buckle.

3. The method of claim 1 in which said buckle is an elastic buckle.

References Cited

UNITED STATES PATENTS

| 2,472,848 | 6/1949 | Paynter | 219—67 |
| 3,287,536 | 11/1966 | Fay | 219—62 |

JOSEPH V. TRUHE, Primary Examiner

L. A. SCHUTZMAN, Assistant Examiner

U.S. Cl. X.R.

219—67, 104